Figure 1:
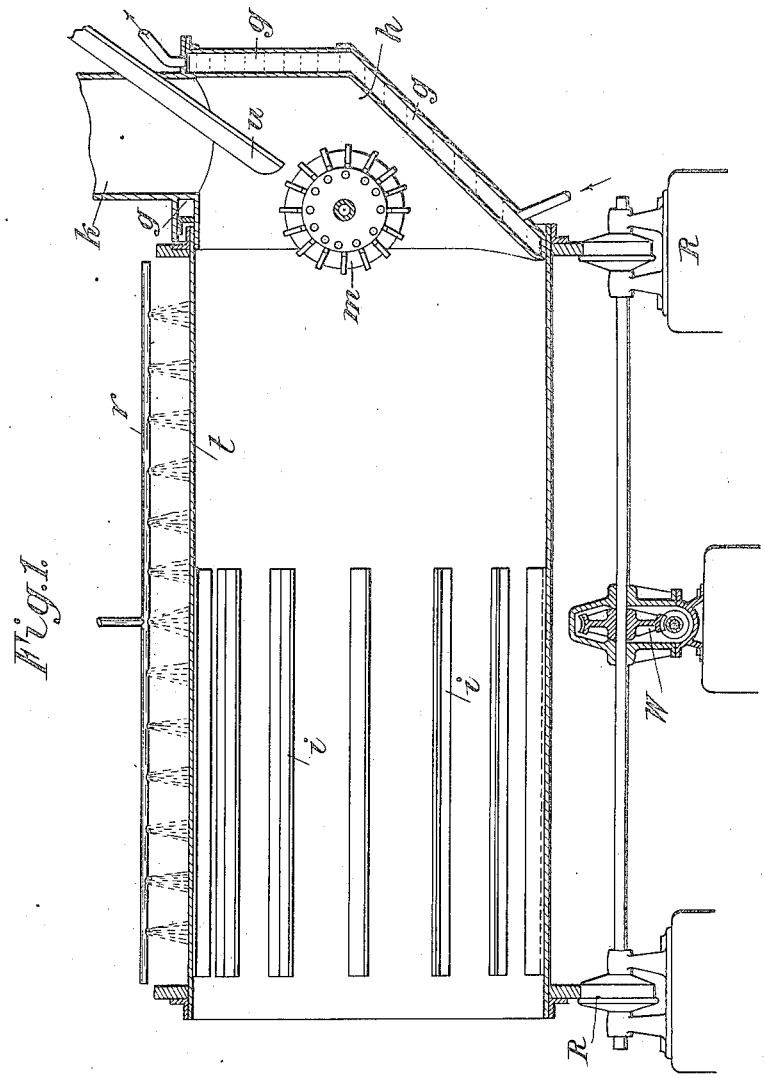

W. LESSING.
METHOD OF PRODUCING CEMENT FROM MOLTEN BLAST FURNACE SLAG.
APPLICATION FILED AUG. 9, 1913.

1,115,321.

Patented Oct. 27, 1914.
3 SHEETS—SHEET 1.

WITNESSES
C. A. Krey
G. Wedemeier

INVENTOR
WILHELM LESSING
BY
ATTORNEYS

W. LESSING.
METHOD OF PRODUCING CEMENT FROM MOLTEN BLAST FURNACE SLAG.
APPLICATION FILED AUG. 9, 1913.

1,115,321.

Patented Oct. 27, 1914.
3 SHEETS—SHEET 3.

WITNESSES
INVENTOR
WILHELM LESSING
BY
ATTORNEY

UNITED STATES PATENT OFFICE.

WILHELM LESSING, OF MENZENBERG, NEAR HONNEF, GERMANY, ASSIGNOR TO MITTELRHEINISCHE CEMENT-INDUSTRIE G. M. B. H., OF COLOGNE, GERMANY, A FIRM.

METHOD OF PRODUCING CEMENT FROM MOLTEN BLAST-FURNACE SLAG.

1,115,321. Specification of Letters Patent. Patented Oct. 27, 1914.

Application filed August 9, 1913. Serial No. 783,922.

*To all whom it may concern:*

Be it known that I, WILHELM LESSING, a citizen of the German Empire, residing at Menzenberg, near Honnef-on-the-Rhine, in Germany, have invented an Improved Method of Producing Cement from Molten Blast-Furnace Slag, of which the following is a specification.

My invention relates to the production of cement from molten blast-furnace slag, and a primary object is to provide an improved method of disintegrating such slag and subjecting it to the action of air, or of air and steam, and thereby making cement.

It has heretofore been known to project highly-heated slag in a disintegrated state through a nearly vertical rotating tube, but in such an apparatus the disintegrated slag falls too rapidly and the natural draft of air which flows through the tube from its lower to its upper end does not act sufficiently on the slag. It is also known to project molten slag in a finely divided state through an approximately horizontal rotating tube, but in this apparatus the slag was not disintegrated by purely mechanical means, but by the aid of a fluid, such as air or steam, and in this case a current of air or the like flowed from the upper to the lower end of the tube.

When a current of air is used in the known manner for disintegrating the slag a considerable proportion of slag wool is formed unless the air is more or less moistened, and this is a troublesome operation as the degree of moisture must be carefully regulated. On the other hand, jets of steam and air are also liable to carry relatively large lumps of slag through the tube or drum, such lumps being the size of peas or hazel-nuts at the outlet. In this known method the slag or the like travels through the drum, which may be 15 meters or more in length, together with a hot current of gas and vapor which does not materially aid in cooling the slag. Air admitted at the end where the slag enters and drawn out by suction at the opposite end is heated considerably by contact with the hot liquid slag at the admission end and travels in its heated state with the slag. When this hot air or a mixture of other gases and especially sulfurous acid travels in the same direction as the slag, as in the known methods of producing cement from liquid slag referred to above, it exercises a deleterious action on the slag.

Another object of my invention is to obviate these defects of known methods.

To these ends my invention consists in the operations described hereinafter and pointed out in the claims.

According to my invention I project the molten slag in a disintegrated state through an approximately horizontal rotary cooled tube or conduit and simultaneously cause a current of air, with or without an admixture of steam, to flow through the same tube or conduit in the opposite direction. When making the cement I use, instead of jets of steam or air, a rotary appliance, *e. g.* a drum or wheel, for purely mechanically projecting the liquid slag in a disintegrated state into the substantially horizontal conduit, the liquid slag being poured on to the said rotary appliance at the higher end of the conduit. A rotary drum or wheel disintegrates the material much more effectively than a jet of air or steam and without any tendency to produce slag wool and large lumps of slag, the particles being of the size of coarse grit or even smaller. I admit air into the tube or conduit at the end at which the slag leaves the same, so that the slag and air travel in opposite directions, the air being discharged through a chimney or uptake at the end at which the slag enters.

Some advantages of the counter-current of air are that it carries with it those vapors and gases which are liberated when the slag is disintegrated, so that they do not travel through the tube or conduit with the slag. Secondly, the air introduced cold takes up heat from the slag when traveling through the tube or conduit and greatly accelerates the cooling process. This enables the length of the tube or conduit to be considerably reduced and less driving power is required. Any admixtures to be used with the slag can be introduced in a dry state during the atomizing operation of the rotary drum and the quality of the slag can thus be improved.

While the slag is passing from the one end of the tube or conduit to the other after being disintegrated it is subjected to an additional disintegrating action owing to its impacting against the ribs provided on the internal periphery of the tube or conduit which is preferably water-cooled and rotated about its longitudinal axis.

Two forms of apparatus adapted for carrying my invention into practice are diagrammatically represented by way of example in the accompanying drawings, wherein:—

Figure 2:
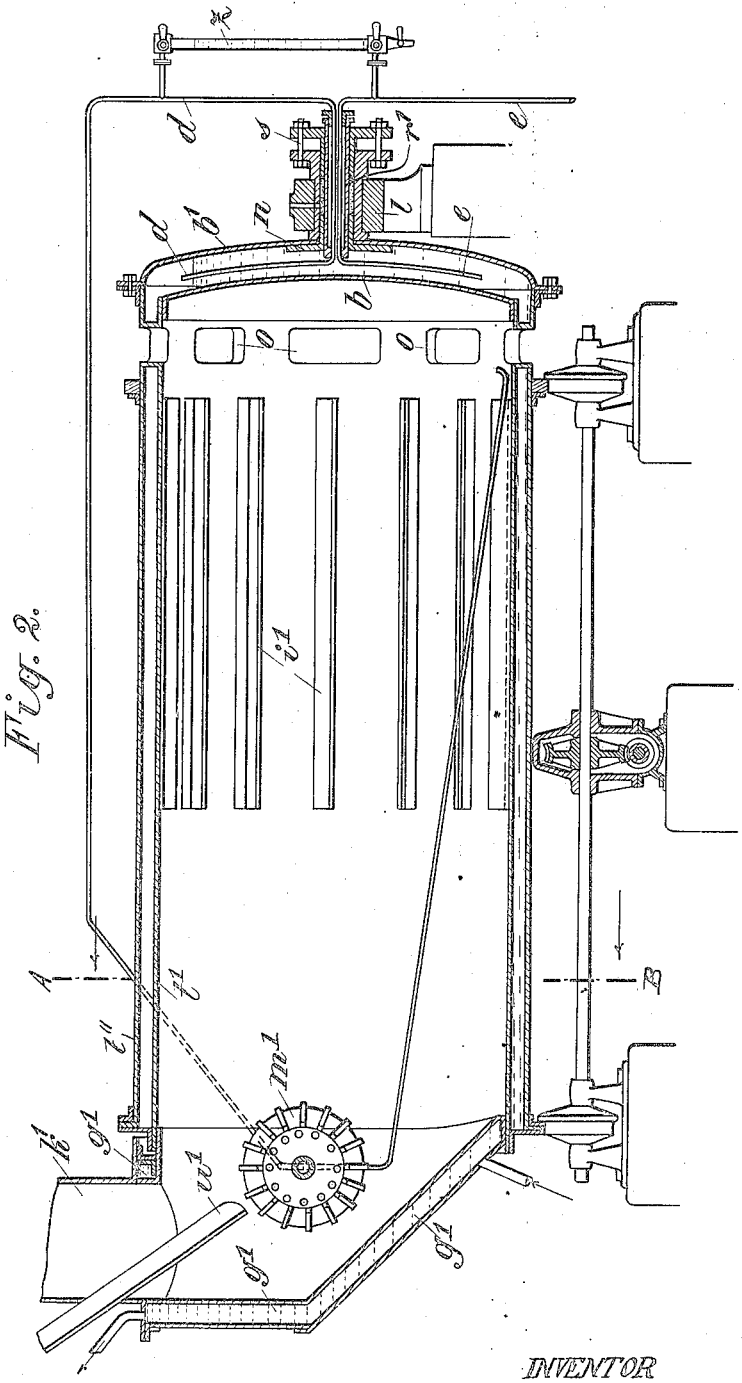
Figure 3:
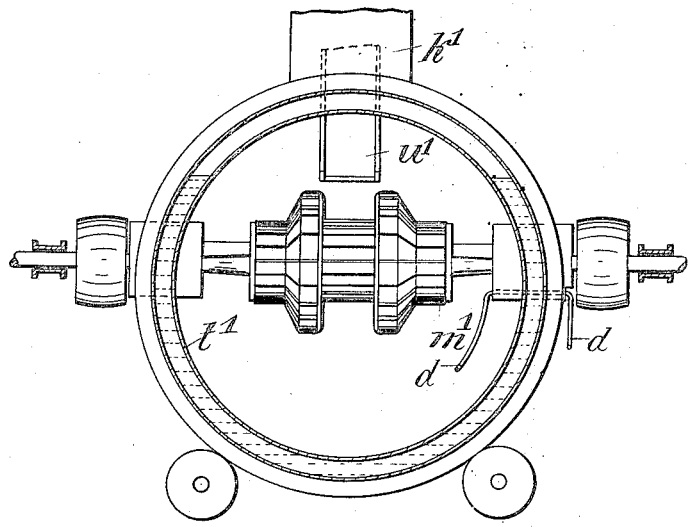

Figure 1 is a longitudinal section of one form of the apparatus, and Fig. 2 a similar section of the other form, Fig. 3 being a cross-section on the line A—B of Fig. 2.

Referring in the first instance to the construction shown in Fig. 1, $t$ designates the cooling drum, at the right hand end of which there is a stationary housing $h$ into which the molten slag is introduced by means of a channel $u$. The housing $h$ has a chimney $k$ and a water jacket $g$, and its floor is downwardly inclined toward the floor of the drum $t$ within which it terminates. A rotary projecting drum $m$ is arranged in the housing between the floor and the channel $u$. The drum $t$ is rotated by means of worm gear W and rollers R, and is externally cooled by means of spraying apparatus $r$. In the interior of the drum ribs $i$ are provided for acting on the slag. The left hand end of the drum is open, and air drawn in at that end passes out through the chimney or uptake $k$.

In the construction shown in Figs. 2 and 3 the parts designated $g^1$, $k^1$, $u^1$, $m^1$ are similar to the parts $g$, $k$, $u$, $m$ in Fig. 1, and are arranged at the left-hand end of a rotary drum $t^1$ having a water-jacket $t^{11}$ whereby it is cooled. In the interior of the drum there are ribs $i^1$, and near the lower end of the drum there are holes $o$, which admit air. The lower end of the drum is closed by a head $b$, which has a water-jacket $b^1$ communicating with the water jacket $t^{11}$ and provided with a hollow journal $n$ mounted in a bearing $l$. Through the journal $n$ passes a tube $r^1$ the joint between same and the journal being made tight by means of a stuffing box $s$. The tube $r^1$ serves as a sheath for two bent pipes $d$ and $e$, both of which are joined to a water gage $z$. These pipes extend into the water jacket $b^1$, the pipe $d$ being bent upward and terminating in the steam space above the water level in the jacket, and the pipe $e$ being bent downward, and terminating in the water. The pipe $e$ is used for feeding water to the jackets $b^1$ and $t^{11}$, and the pipe $d$ conveys steam generated in the water jackets to the interior of the drum $t^1$. The admission of steam to the drum renders the slag more friable and easy to grind.

What I claim as my invention and desire to secure by Letters Patent of the United States is:—

1. The herein described method of producing cement from molten blast-furnace slag consisting in projecting the molten slag in a disintegrated condition by a mechanical agitator into an approximately horizontal conduit, and simultaneously causing a current of air to flow through the conduit in the opposite direction.

2. The herein described method of producing cement from molten blast-furnace slag consisting in projecting the molten slag in a disintegrated condition by a mechanical agitator into an approximately horizontal conduit, and simultaneously causing a current of air and steam to flow through the conduit in the opposite direction.

3. The herein described method of producing cement from molten blast-furnace slag consisting in projecting the molten slag in a disintegrated state by a mechanical agitator into an approximately horizontal rotatory cooled tube, and in simultaneously forcing a current of air through the tube in the opposite direction.

In witness whereof I have signed this specification in the presence of two witnesses.

WILHELM LESSING.

Witnesses:
 WOLDEMAR HAUP,
 HENRY HASPER.